US008150582B2

(12) United States Patent
Blommer et al.

(10) Patent No.: US 8,150,582 B2
(45) Date of Patent: Apr. 3, 2012

(54) SYSTEMS AND METHODS FOR DECOUPLING STEERING RACK FORCE DISTURBANCES IN ELECTRIC STEERING

(75) Inventors: Michael Alan Blommer, Ann Arbor, MI (US); Paul George Sanders, Milan, MI (US); Hongtei Eric Tseng, Canton, MI (US); Dexin Wang, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 436 days.

(21) Appl. No.: 12/426,463

(22) Filed: Apr. 20, 2009

(65) Prior Publication Data

US 2010/0268422 A1 Oct. 21, 2010

(51) Int. Cl.
*G06F 19/00* (2011.01)

(52) U.S. Cl. ............................ 701/44; 701/42; 180/446

(58) Field of Classification Search .................... 701/41, 701/42, 44; 180/443, 446
See application file for complete search history.

(56) References Cited

U.S. PATENT DOCUMENTS

| | | | | |
|---|---|---|---|---|
| 6,108,599 | A | 8/2000 | Yamamoto et al. | |
| 6,751,538 | B2 | 6/2004 | Endo | |
| 6,999,862 | B2 | 2/2006 | Tamaizumi et al. | |
| 7,273,127 | B2 * | 9/2007 | Pick et al. | 180/446 |
| 2004/0148080 | A1 | 7/2004 | Ekmark et al. | |
| 2008/0243329 | A1 | 10/2008 | Hamel et al. | |
| 2008/0308342 | A1 | 12/2008 | Nishimori et al. | |
| 2009/0009127 | A1 | 1/2009 | Imamura et al. | |

OTHER PUBLICATIONS

Groll, Max et al. “Disturbance Compensation with a Torque Controllable Steering System.” Vehicle System Dynamics, Apr. 2006, pp. 327-338, vol. 44, No. 4.

Shoji, Asai et al., “Development of a Steer-by-Wire System with Force Feedback Using a Disturbance Observer.” Webpage; http://www.sae.org/technical/papers/2004-01-1100. Mar. 2004.

Rösth, Marcus. “Hydraulic Power Steering System Design in Road Vehicles—Analysis, Testing and Enhanced Functionality.” Webpage. http://www.diva-portal.org/diva/getDocument?urn_nbn_se_liu_diva-8186-1__fulltext.pdf, 2007.

Ackermann. J. et al. “Yaw Disturbance Attenuation by Robust Decoupling of Car Steering.” Webpage: http://home.robotic.de/fileadmin/control/buente/publications/acker97d.pdf, 1997.

* cited by examiner

*Primary Examiner* — Gertrude Arthur Jeanglaude
(74) *Attorney, Agent, or Firm* — O’Brien Jones PLLC

(57) ABSTRACT

A system for decoupling steering rack force disturbances in electric steering may comprise a steering wheel angle sensor, a yaw rate sensor, a lateral acceleration sensor, and a steering torque sensor. The system may also comprise a tire force generator configured to receive signals from the steering wheel angle sensor, the yaw rate sensor, and the lateral acceleration sensor and send a reference rack force to a controller. The system may further comprise a rack force observer configured to receive signals from the steering torque sensor and send an estimated rack force to the controller, wherein the controller is configured to receive signals from the tire force generator and the rack force observer, compare the estimated rack force with the reference rack force to determine a rack force disturbance, and adjust an auxiliary torque based on the rack force disturbance.

20 Claims, 8 Drawing Sheets

10
11
21
22
12
24
TIRE FORCE GENERATOR
13
EPAS CONTROLLER
26
RACK FORCE OBSERVER
14
25
20
18
15
16a
19
16
23
17

SYSTEMS AND METHODS FOR DECOUPLING STEERING RACK FORCE DISTURBANCES IN ELECTRIC STEERING

TECHNICAL FIELD

The present teachings relate generally to systems and methods for decoupling steering rack force disturbances in electric steering. More specifically, the present teachings relate to systems and methods for decoupling steering rack force disturbances in a vehicle's electric steering system that can provide improved steering feel, robust to tire property variability, steering friction variability and hardware degradation.

BACKGROUND

In motor vehicles, various periodic disturbances can occur in the steering system. For example, variations in road surface friction and profile, asymmetric brake torque and differential acceleration of the front wheels can cause disturbances in the longitudinal tire forces, lateral tire forces, tire self-aligning moment and suspension deflection forces for the front wheels. These disturbances, which can manifest themselves as steering rack force disturbances, are relayed to the driver through the steering column, affecting the steering feel of the vehicle and in some cases vehicle stability. To meet customer expectations with regard to a specific steering feel it can be advantageous for vehicle steering systems to have knowledge of such disturbances and the ability to reject or suppress them.

Accordingly, vehicle steering systems are generally designed to meet a specific steering feel based upon a reference tire. Drivers, however, will generally change a vehicle's tires at least once throughout the life of a vehicle, replacing the original manufacture (OEM) tires with new and perhaps inferior tires, thus altering the steering feel, which can depend upon the actual tire used on the vehicle.

Conventional electric steering systems, such as, for example, electric power assisted steering (EPAS), which is designed to assist a driver with vehicle steering by applying an auxiliary torque to the steering system, have some limited capability of suppressing rack force disturbances through techniques, including, for example, adaptive assist gain and/or controlled damping. Such methods, however, can also compromise steering feel.

Known methods for decoupling steering rack force disturbances in electric steering, which typically involve filters or very general comparisons between a total rack force and a reference rack force, can be impractical, oversimplified, and/or inaccurate for many real-world disturbances.

SUMMARY

In accordance with various exemplary embodiments, the present teachings provide a system for decoupling steering rack force disturbances in electric steering. The system may comprise a steering wheel angle sensor, a yaw rate sensor, a lateral acceleration sensor, and a steering torque sensor. The system may also comprise a tire force generator configured to receive signals from the steering wheel angle sensor, the yaw rate sensor, and the lateral acceleration sensor and send a reference rack force to a controller. The system may further comprise a rack force observer configured to receive signals from the steering torque sensor and send an estimated rack force to the controller, wherein the controller is configured to receive signals from the tire force generator and the rack force observer, compare the estimated rack force with the reference rack force to determine a rack force disturbance, and adjust an auxiliary torque based on the rack force disturbance.

In accordance with various additional exemplary embodiments, the present teachings provide a system for decoupling steering rack force disturbances in electric steering, which may comprise a yaw rate sensor, a lateral acceleration sensor, and at least one electric steering sensor. The system may also comprise a rack force generator configured to receive signals from the yaw rate sensor, the lateral acceleration sensor, and the at least one electric steering sensor and send a reference rack force to a controller. The system may further comprise a rack force observer configured to receive signals from the at least one electric steering sensor and send an estimated rack force to the controller, wherein the controller is configured to receive signals from the rack force generator and the rack force observer, compare the estimated rack force with the reference rack force to determine a rack force disturbance, and adjust an auxiliary torque based on the rack force disturbance.

Various further exemplary embodiments of the present teachings provide a method for decoupling steering rack force disturbances in electric steering. The method may comprise determining a reference rack force; formulating an observer to provide an estimated rack force; comparing the estimated rack force with the reference rack force to determine a rack force disturbance; and adjusting an auxiliary torque in response to the rack force disturbance.

Additional objects and advantages of the present teachings will be set forth in part in the description which follows, and in part will be obvious from the description, or may be learned by practice of the present teachings. Various objects and advantages of the present teachings will be realized and attained by means of the elements and combinations particularly pointed out in the appended claims.

It is to be understood that both the foregoing general description and the following detailed description are exemplary and explanatory only and are not restrictive of the present teachings.

The accompanying drawings, which are incorporated in and constitute a part of this specification, illustrate embodiments of the present teachings and together with the description, serve to explain the principles of the present teachings.

BRIEF DESCRIPTION OF THE DRAWINGS

At least some features and advantages will be apparent from the following detailed description of embodiments consistent therewith, which description should be considered with reference to the accompanying drawings, wherein:

FIG. 5B is a graph illustrating the steering wheel torque corresponding to the rack force of FIG. 4, with disturbance decoupling/rejection in accordance with the present teachings on;

FIG. 6B is a graph illustrating the steering wheel torque corresponding to a simulated vehicle cornering maneuver, with disturbance decoupling/rejection in accordance with the present teachings on;

FIG. 8B is a graph illustrating the steering wheel torque corresponding to the rack force of FIG. 7, with disturbance decoupling/rejection in accordance with the present teachings on;

Figure 1:
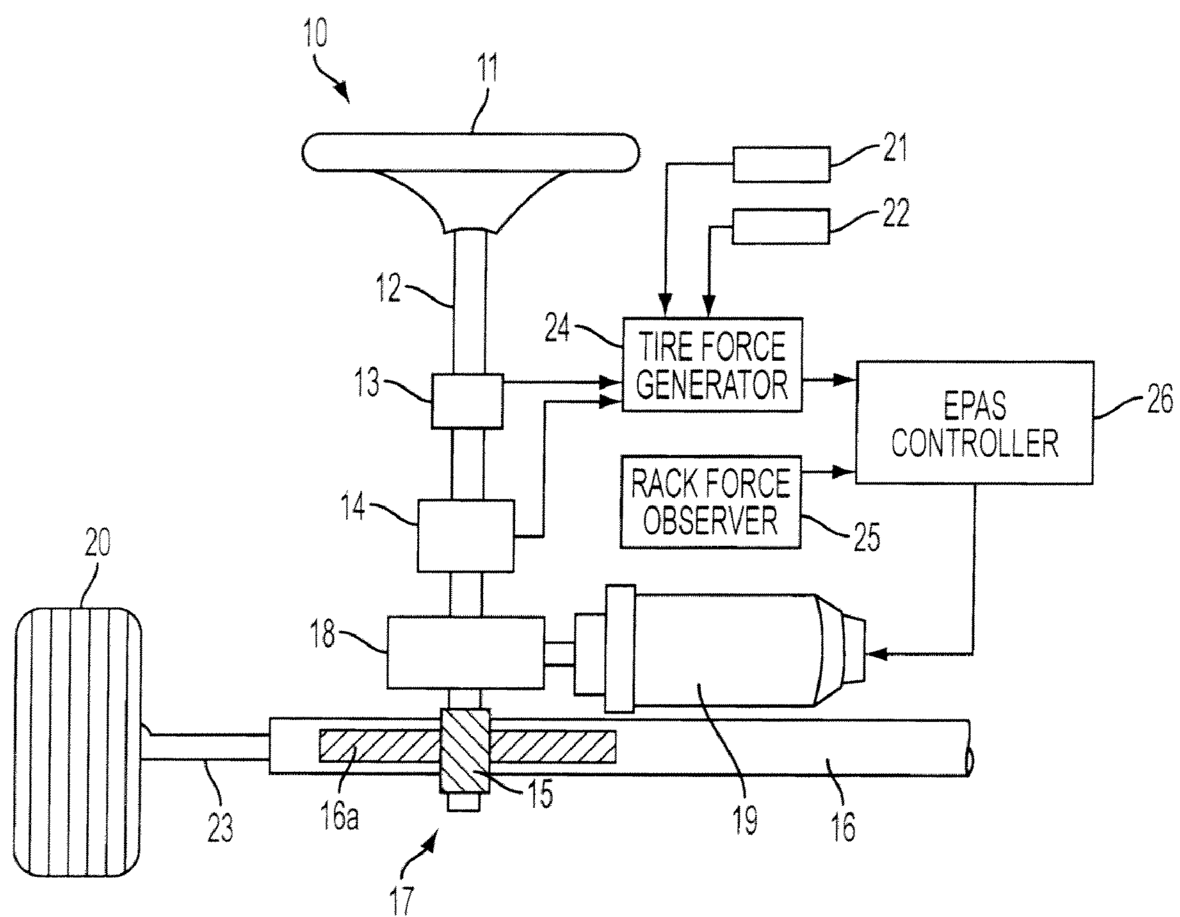
FIG. 1 is a schematic diagram showing the structure of an exemplary embodiment of a system for decoupling steering rack force disturbances in electric steering in accordance with the present teachings.

Although the following detailed description makes reference to illustrative embodiments, many alternatives, modifications, and variations thereof will be apparent to those skilled in the art. Accordingly, it is intended that the claimed subject matter be viewed broadly.

DESCRIPTION OF THE EMBODIMENTS

Reference will now be made in detail to various embodiments, examples of which are illustrated in the accompanying drawings. However, these various exemplary embodiments are not intended to limit the disclosure. To the contrary, the disclosure is intended to cover alternatives, modifications, and equivalents.

A vehicle's electric steering system can maintain a consistent steering feel in accordance with established driver expectations by continuously rejecting and/or suppressing disturbances to the steering rack. A robust system for decoupling steering rack force disturbances is, therefore, a valuable feature in an electric steering system. The more accurately steering rack force disturbances can be decoupled or isolated, independent of a vehicle's various dynamic characteristics, such as, for example, tire property variability, steering friction variability, and hardware degradation, the more accurately a vehicle's electric steering can determine how much motor assist (auxiliary torque) is required to counterbalance the disturbances to provide an improved steering feel. The decoupling of rack force disturbances can additionally provide drivers with critical information regarding vehicle safety, such as, for example possible vehicle stability problems and/or tire imbalance or deterioration.

To enable dynamic decoupling of rack force disturbances in electric steering, various exemplary embodiments of the present teachings contemplate using one or more sensors to provide signals to either a tire force generator or a rack force generator, which utilize the signals to determine a reference rack force. Various exemplary embodiments of the present teachings further contemplate using one or more sensors to provide signals to a rack force observer which utilizes the signals to determine an estimated rack force. The one or more sensors may include existing vehicle sensors when available, such as, for example, Electric Power Assisted Steering (EPAS) sensor(s), steering wheel angle sensors, yaw rate sensors, lateral acceleration sensors, speed sensors, or a combination thereof. Because most existing vehicles already contain the above sensors, certain embodiments of the present teachings contemplate using only existing sensors. Embodiments of the present teachings also contemplate a system including additional sensors as needed to provide the signal inputs used in the systems and methods of the present teachings.

To determine rack force disturbances, the present teachings consider comparing the reference rack force with the estimated rack force. As used herein, the term "reference rack force" refers to the desired rack force which provides optimal steering feel, and the term "estimated rack force" refers to an estimated or real rack force in light of rack force disturbances. As used herein, the term "rack force disturbance", or "disturbance" refers to a periodic or random disruption to the load of a vehicle's wheels and to the vehicle's steering, caused, for example, by tire property deterioration, road disturbances, or friction variability in the steering gear and suspension joints. Various exemplary embodiments of the present teachings define rack force disturbances as any deviation between the reference rack force and the estimated rack force. The steering system's motor assist, which provides an auxiliary torque to the driver's steering torque input, can then be adjusted to compensate for the disturbances (i.e., to achieve the desired rack force and steering feel).

FIG. 1 shows the structure of an exemplary embodiment of a system for decoupling steering rack force disturbances in electric steering in accordance with the present teachings. An Electronic Power Assisted Steering (EPAS) system 10 applies auxiliary torque to the steering torque applied by a driver to a steering column 12 via a steering wheel 11. In the illustrated exemplary embodiment, the steering column 12 is connected to the steering wheel 11 at the top end, and a pinion gear 15 is attached to the bottom end. The pinion gear 15 meshes with a rack gear **16*a* formed in a rack shaft 16. The pinion gear 15 and the rack gear 16*a* together form a rack-and-pinion mechanism 17. Tie rods 23 are provided at both ends of the rack shaft 16, and turning wheels 20 are attached at the outer ends of the tie rods 23**.

A motor 19 that outputs rotational force for assisting the steering torque is connected to the steering column 12 via a power transmission device 18. The rotational force of the motor 19 is applied as auxiliary torque to the steering column 12 via the power transmission mechanism 18.

A steering torque sensor 14 is attached to the steering column 12. When the driver adds steering torque to the steering column 12 by operating the steering wheel 11, the steering torque sensor 14 detects the steering torque applied to the steering column 12. A steering wheel angle sensor 13 senses the steering wheel angle in the rotation of the steering column 12.

A tire force generator 24 is configured to receive signals from the steering wheel angle sensor 13, and from various vehicles sensors, including, for example, a vehicle yaw rate sensor 21 and a vehicle lateral acceleration sensor 22. The tire force generator 24 is configured to estimate a reference rack force based on at least one of the signals received from sensors 13, 21 and 22, as set forth in the following exemplary embodiments, and send the reference rack force to an EPAS controller 26. The tire force generator 24 may include, for example, an existing vehicle controller such as a stability controller or be a part of the EPAS controller 26, a dedicated controller, or the tire force generator 24 may be distributed among more than one vehicle controller, as would be understood by one skilled in the art.

A rack force observer 25 is configured to receive signals from various EPAS sensors, including, for example, the steering torque sensor 14. The rack force observer 25 is configured to determine an estimated rack force based on at least the signals received from sensor 14, as set forth in the following exemplary embodiments, and send the estimated rack force to the EPAS controller 26. The rack force observer 25 may include, for example, an existing vehicle controller such as a stability controller or be part of the EPAS controller 26, a dedicated controller, or the rack force observer 25 may be distributed among more than one vehicle controller, as would be understood by one skilled in the art.

The EPAS controller 26 is configured to receive signals from the tire force generator 24 and the rack force observer 25. The EPAS controller is configured to compare the reference rack force and the estimated rack force to determine a rack force disturbance, and adjust the rotational force of the motor 19, applied as an auxiliary torque to the steering column 12, based on the rack force disturbance (i.e., to compensate for the rack force disturbance).

Figure 2:
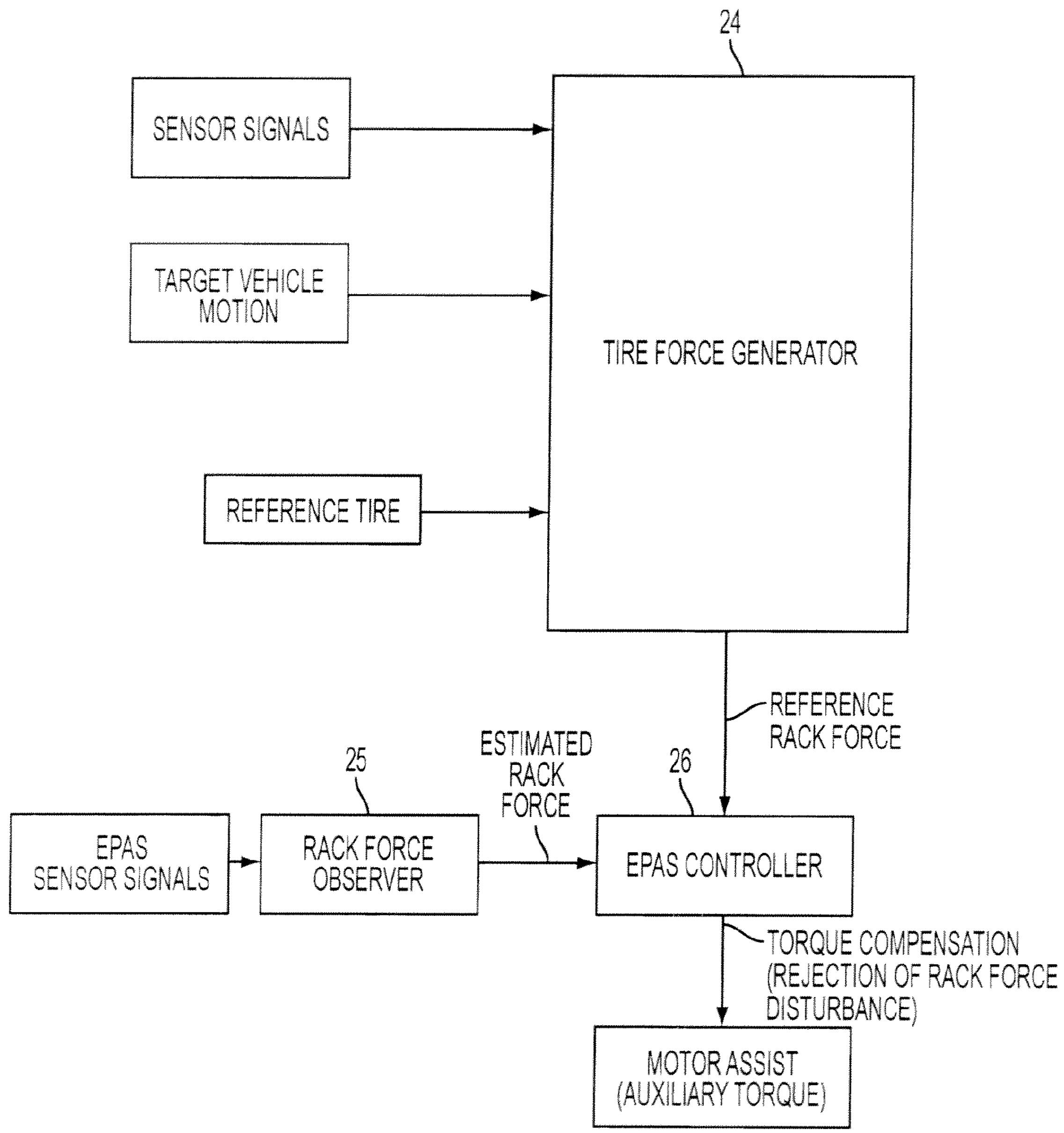
FIG. 2 is a block diagram of a system for decoupling steering rack force disturbances in electric steering in accordance with an exemplary embodiment of the present teachings.

In accordance with various embodiments of the present teachings, as depicted on a very high level in the block diagram of FIG. 2, the tire force generator 24 can determine a reference rack force by using tire lateral forces and self-aligning moments. For example, in various embodiments of the present teachings, a tire slip angle ($\alpha$) can be determined using the following functional relation $$\alpha=\delta-f(V_x,\alpha_y,\dot{\phi}) \quad (1)$$

wherein $\delta$ is steering wheel angle, $V_x$ is vehicle speed, $\alpha_y$ is vehicle lateral acceleration, and $\dot{\phi}$ is vehicle yaw rate.

For example the tire force generator 24 can apply this relation through straightforward arithmetic calculations, as represented by the below equation:

$$\alpha = \delta - \frac{V_{sy} + \dot{\varphi} l_s}{V_{sx} + \dot{\varphi} b_s} \quad (2)$$

wherein ($l_s$, $b_s$) is longitudinal and lateral sensor location with respect to the wheel center and ($V_{sx}$, $V_{sy}$) is vehicle velocities at the sensor location. Sensors 13 and 21 can respectively measure steering wheel angle ($\delta$) and vehicle yaw rate ($\dot{\phi}$), while the tire force generator 24 can derive the velocities ($V_{sx}$, $V_{sy}$) from the lateral acceleration sensor 22.

The quality of the calculated tire slip angle, however, depends upon the signal quality of sensors 13, 21 and 22. Accordingly various embodiments of the present teachings additionally consider that a mechanism for detecting and/or removing sensor drift is present in the vehicle. Sensor drift can adversely affect the performance of any controller: such as, for example, the tire force generator, which depends upon the above sensor readings.

To ensure the integrity of the system's input data, various embodiments of the present teachings alternatively consider using target variables, such as, for example, a target yaw rate and a target vehicle lateral acceleration, instead of sensor signals when determining the tire slip angle ($\alpha$). The target variables, for example, can be based on target vehicle motion. In other words, for a given vehicle speed and driver input, a vehicle should follow a desired or "target" path. Accordingly, in various embodiments, the tire force generator 24 can determine a nominal or target tire slip angle ($\alpha$) using a target yaw rate ($\dot{\phi}$) and a target vehicle lateral acceleration ($\alpha_y$) for a given steering wheel angle input ($\delta$) and an instantaneous vehicle speed.

Although the present teachings assume availability of vehicle speed information, vehicle speed can be obtained through any known suitable method, including methods that may require information from additional vehicle sensors. Accordingly, the above disclosed sensors can be a minimal set of sensors required for decoupling steering rack force disturbances in electric steering.

In various exemplary embodiments of the present teachings, the tire force generator 24 can determine a tire lateral force ($F_y$) as a function of the tire slip angle ($\alpha$), a tire normal force ($F_z$) and a road friction ($\mu$). The present teachings contemplate using any known suitable methods to estimate the tire lateral force ($F_y$). By way of example only, various embodiments of the present teachings contemplate using the following relation:

$$F_y=\mu F_z[3\eta\alpha-3(\eta\alpha)^2+(\eta\alpha)^3] \quad (3)$$

wherein $\eta=C_{\alpha f}/(3\mu F_z)$ and $C_{\alpha f}$ is tire cornering stiffness.

The present teachings consider using any known suitable methods to estimate tire normal force ($F_z$) and road friction ($\mu$). Although the present teachings assume availability of road friction information, estimated road friction can be obtained through any known suitable method, including methods that may require information from additional vehicle sensors and/or controllers in order to estimate road friction. Thus, various exemplary embodiments of the present teachings contemplate that the tire force generator 24 can directly estimate tire normal force and road friction, while various alternative exemplary embodiments contemplate that the tire force generator 24 can receive signals relating to an estimated tire normal force and road friction.

The present teachings additionally consider using any known suitable method(s) to dynamically estimate tire cornering stiffness ($C_{\alpha f}$), such as, for example, the estimation methods disclosed in U.S. application Ser. No. 12/109,482, filed on Apr. 25, 2008 and titled, "System and Method for Tire Cornering Power Estimation and Monitoring," the teachings of which are hereby incorporated by reference herein.

Because a vehicle's current or "actual" tire properties may differ from a vehicle's design or "reference" tire properties due to, for example, age, wear, or replacement, tire property variability may generate what is otherwise perceived to be a rack force disturbance if reference tire properties are used to estimate the reference rack force. Since a vehicle's actual tire properties can be used to estimate tire cornering stiffness, the tire force generator 24 can determine a tire lateral force ($F_y$) and ultimately a reference rack force based on actual tire properties. Thus, by dynamically estimating a tire cornering stiffness, various embodiments of the present teachings can exclude tire property variability as a rack force disturbance, so that the tire forces generated by the tire force generator 24 depend upon the actual tires used on the vehicle, instead of the reference tire used during vehicle development.

Those ordinarily skilled in the art would understand that tire cornering stiffness can additionally or alternatively be obtained through any known suitable methods, including methods that may require information from additional sensors and/or controllers in order to estimate stiffness values, as well as methods that may require determining stiffness values from nominal or target tire properties. Various embodiments of the present teachings, for example, consider using a reference tire to generate a predetermined reference tire cornering stiffness value instead of dynamically estimating a tire cornering stiffness.

In various exemplary embodiments of the present teachings, the tire force generator 24 can then determine a tire self-aligning moment ($M_{FYSAT}$) based on at least the tire lateral force ($F_y$), for example using the following equation:

$$M_{FYSAT}=2F_y(t_m+t_p) \quad (4)$$

wherein $t_m$ is tire mechanical trail, $t_p \approx (1/3)\alpha(1-2\eta\alpha)$ is tire pneumatic trail (e.g., by neglecting the higher order terms when the tire slip angle ($\alpha$) is less than about 2 degrees) and a is the tire contact patch length.

Although the present teachings assume availability of tire pneumatic trail and tire contact patch length information, tire pneumatic trail and tire contact patch length can be obtained through any known suitable methods, including methods that may require information from additional vehicle sensors and/or controllers in order to estimate tire pneumatic trail and tire contact patch length.

In accordance with various embodiments of the present teachings, the tire force generator 24 can determine a reference rack force using a kinematical relationship between a rack displacement and the wheel steering, based on the estimated tire lateral force ($F_y$) and the tire self-aligning moment ($M_{FYSAT}$).

As also depicted in FIG. 2, in accordance with various embodiments of the present teachings, the rack force observer 25 can determine an estimated rack force by formulating an observer. For example, in various embodiments of the present teachings, a third-order observer $\dot{z}$ is formulated as in the following equation:

$$\begin{cases} \dot{z} = Az + BT_m + L(y - \hat{y}) \\ y = Cz \end{cases} \quad (5)$$

wherein z is steering states $[z_1, z_2, z_3]$, y is measured steering or motor position and velocity, $\hat{y}$, is predicted steering or motor position and velocity, and $T_m$ is motor assist torque.

The values of A, B, C, and L are defined as follows:

$$A = \begin{bmatrix} 0 & 1 & 0 \\ 0 & 0 & 1 \\ 0 & 0 & 0 \end{bmatrix}, \quad (6)$$

$$B = \begin{bmatrix} 0 \\ b_0 \\ 0 \end{bmatrix},$$

$$C = [1 \ 0 \ 0]$$

$$L = \begin{bmatrix} 2\zeta\omega_o & 1-\omega_o \\ \omega_o & \zeta\omega_o \\ \zeta\omega_o^2 & 0 \end{bmatrix}$$

wherein $b_0$ is inertia parameter, $\omega_0$ is observer bandwidth, and $\zeta$ is the damping factor in the observer gain matrix L.

The rack force observer 25, for example, can then determine an estimated rack force ($F_r$) from a steering state (z) and a steering torque ($T_{tb}$), for example as obtained from the steering torque sensor 14, using the following relation:

$$z_3 = f(F_r, T_{tb}) \quad (7)$$

Although the present teachings assume availability of observer parameters, such as, for example, gear ratios and rack mass, those ordinarily skilled in the art would understand that such parameters can be readily obtained through design information.

Various exemplary embodiments of the present teachings further contemplate that the rack force observer 25 can be tuned to a required bandwidth. Thus, the tuning of an observer gain can be simplified by using this bandwidth, thereby increasing the accuracy of the estimated rack force values. The present teachings additionally contemplate that the rack force observer 25 can be applied to a variety of non-linear systems. Those ordinarily skilled in the art would, therefore, understand that that the above third-order formulation is for exemplary purposes only, and that the observer can readily be extended to higher order systems.

In accordance with various embodiments of the present teachings, the EPAS controller 26 can then compare the reference rack force with the estimated rack force to determine the rack force disturbances, and the amount of torque compensation required to overcome the disturbances (i.e., how much auxiliary torque must be applied by the motor 19 to suppress or reject the rack force disturbances).

In various embodiments of the present teachings, the EPAS controller 26 can also monitor the estimated rack force disturbance values and notify a driver if a value (i.e., a deviation between the reference rack force and the estimated rack force) exceeds a specified value, indicating a vehicle safety issue, such as, for example, possibly vehicle instability and/or tire imbalance or deterioration.

The present teachings contemplate using a notification system to alert a driver to possible vehicle safety issues. The notification system can audibly and/or visually indicate to the driver that there is a problem. The notification system can include, for example, an indicator light or LCD that is displayed on the vehicle's console, rearview mirror, or other noticeable location. The indicator light or LCD can be constant or blinking, can be displayed only at startup or displayed continuously throughout the vehicle's use, and can be accompanied by a sound to further aid in alerting the driver to the issue.

Figure 3:
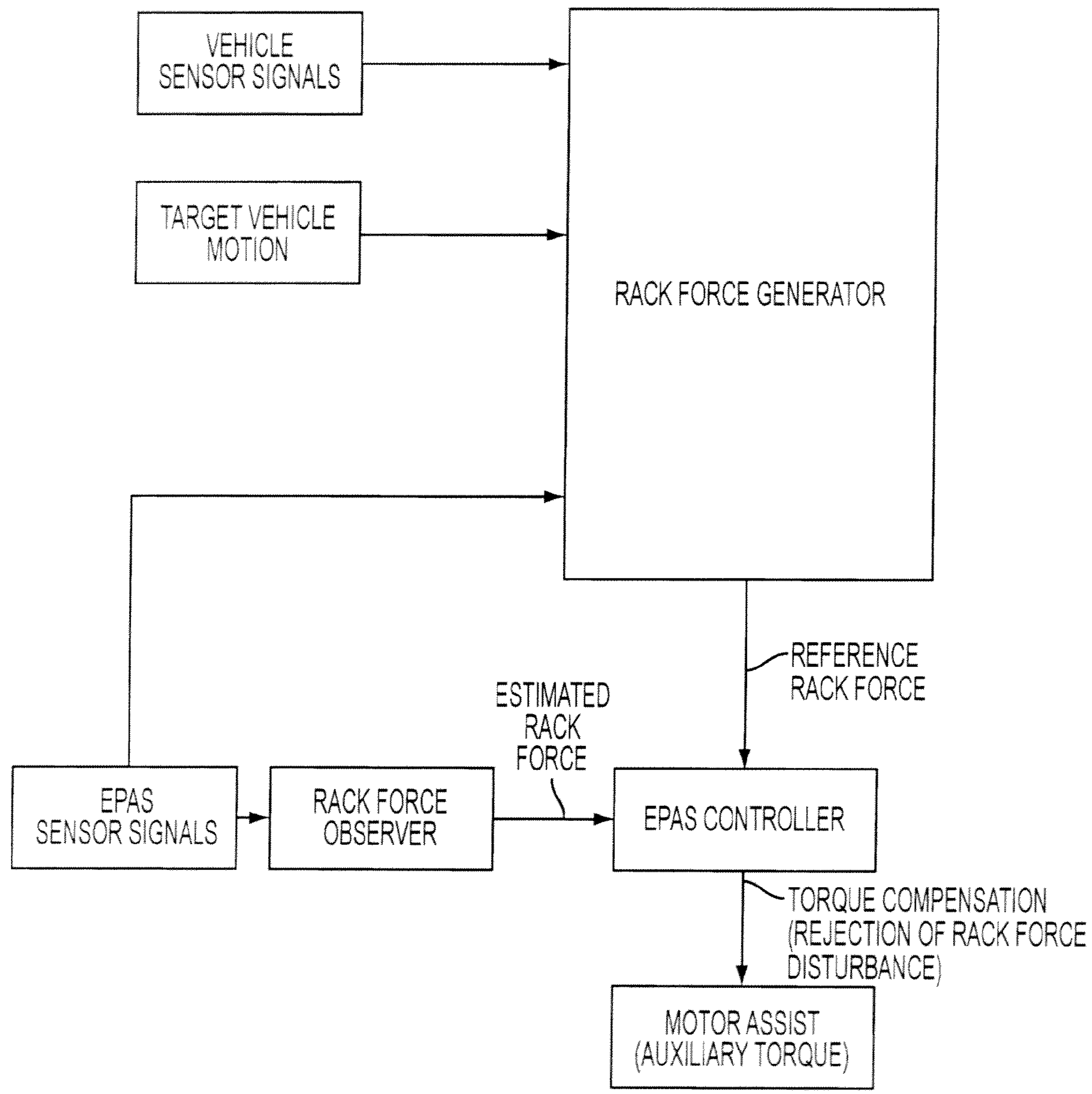
FIG. 3 is a block diagram of a system for decoupling steering rack force disturbances in electric steering in accordance with another exemplary embodiment of the present teachings.

Due to the complexity of tire slip angle estimation, as depicted on a very high level in the block diagram of FIG. 3, various additional exemplary embodiments of the present teachings contemplate using a rack force generator instead of a tire force generator to determine a reference rack force. For example, in various embodiments of the present teachings, a rack force generator can use pre-defined rack force and rack displacement characteristics based on the vehicle and the vehicle's suspension design (e.g., from vehicle sensor signals or target vehicle motion). For example, in various embodiments sensors 21 and 22 can respectively measure vehicle yaw rate and vehicle lateral acceleration, while in various alternative embodiments, the rack force generator can use target vehicle motion to determine a target yaw rate and a target lateral acceleration. For example, as above, target variables, such as target yaw rate and target lateral acceleration, can be based on target vehicle motion. In other words, for a given vehicle speed and driver input, a vehicle should follow a desired or "target" path, producing target vehicle parameters.

In various exemplary embodiments, the rack force generator can then dynamically determine a reference rack force using a kinematical relationship between the rack force displacement and a steering input provided, for example, by an EPAS system. Accordingly, the rack force generator can determine the reference rack force based on look-up tables defining this relationship, as would be understood by those skilled in the art.

In accordance with various exemplary embodiments of the present teachings, as described in detail above, a rack force observer can determine an estimated rack force by formulating an observer. A controller, such as, for example, an EPAS controller can then compare the reference rack force with the estimated rack force to determine the rack force disturbances, and the amount of torque compensation required to overcome the rack force disturbances (i.e., how much auxiliary torque must be applied by a motor to suppress or reject the rack force disturbances).

To verify the accuracy and performance of the above steering rack force decoupling systems and methods, the inventors conducted various lab tests and simulations, as illustrated in FIGS. 4-8.

Figure 4:
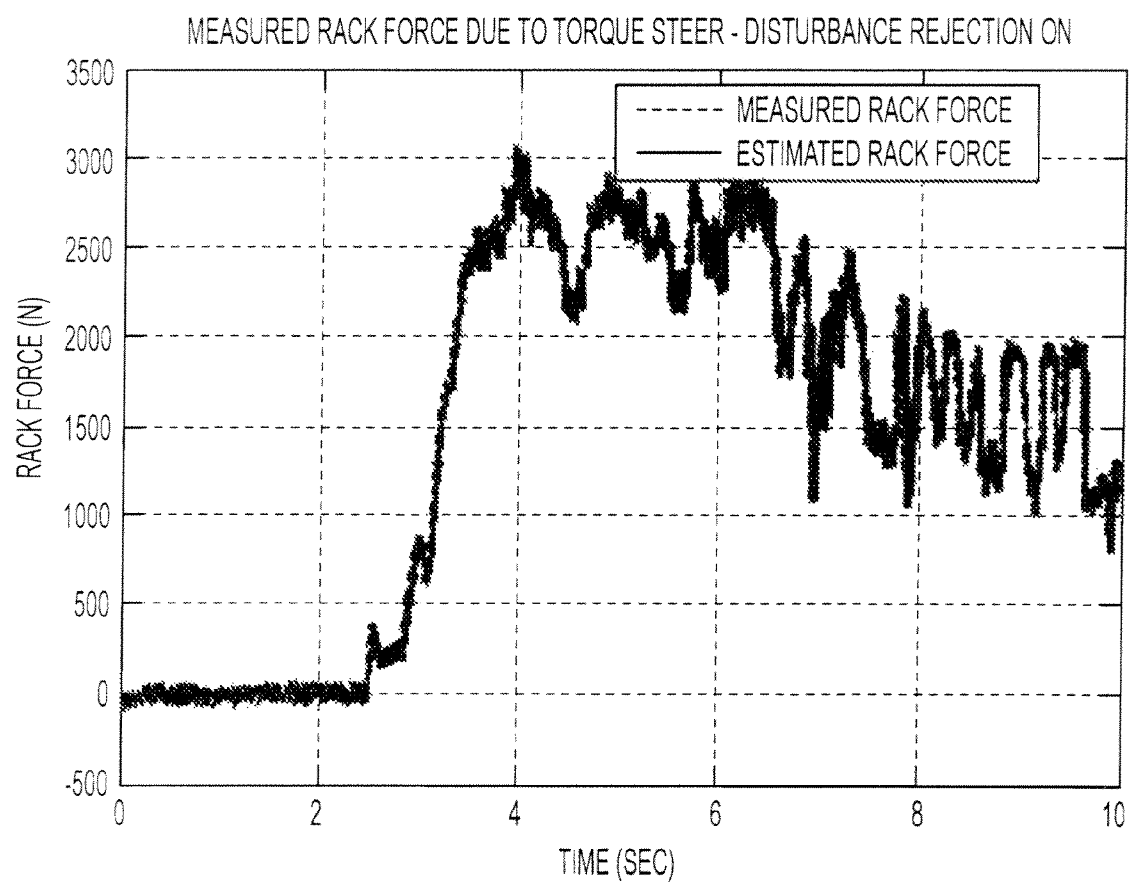
FIG. 4 is a graph illustrating rack force as a function of time for an estimated and a measured rack force.

In FIG. 4, an estimated rack force (i.e., generated using a rack force observer in accordance with the present teachings) was compared with a measured rack force, replayed in a simulation as a function of time (sec). As shown in FIG. 4, the estimated rack force was nearly identical to the measured rack force over the entire period.

Figure 5A:
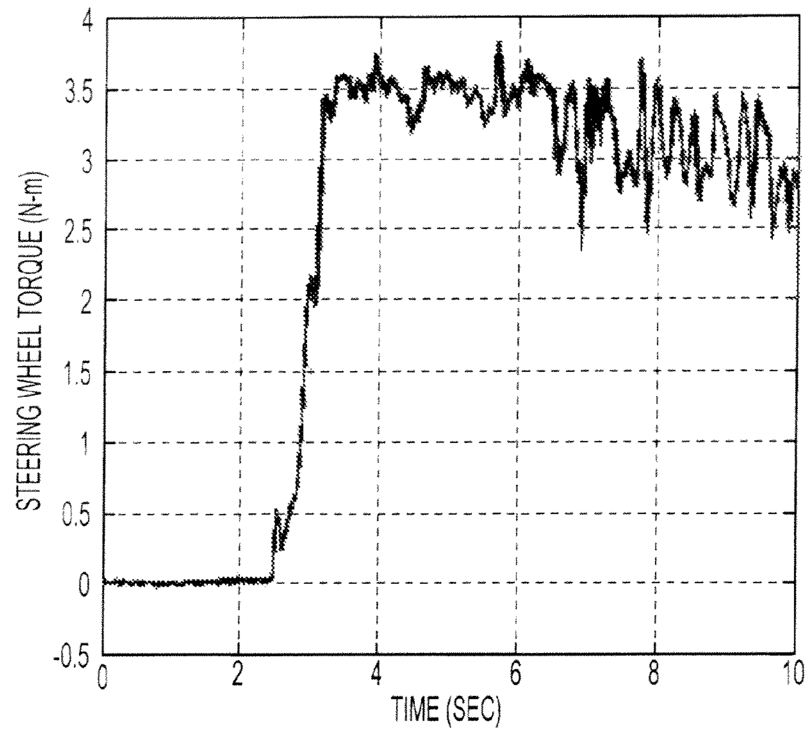
FIG. 5A is a graph illustrating the steering wheel torque corresponding to the rack force of FIG. 4.
Figure 5B:
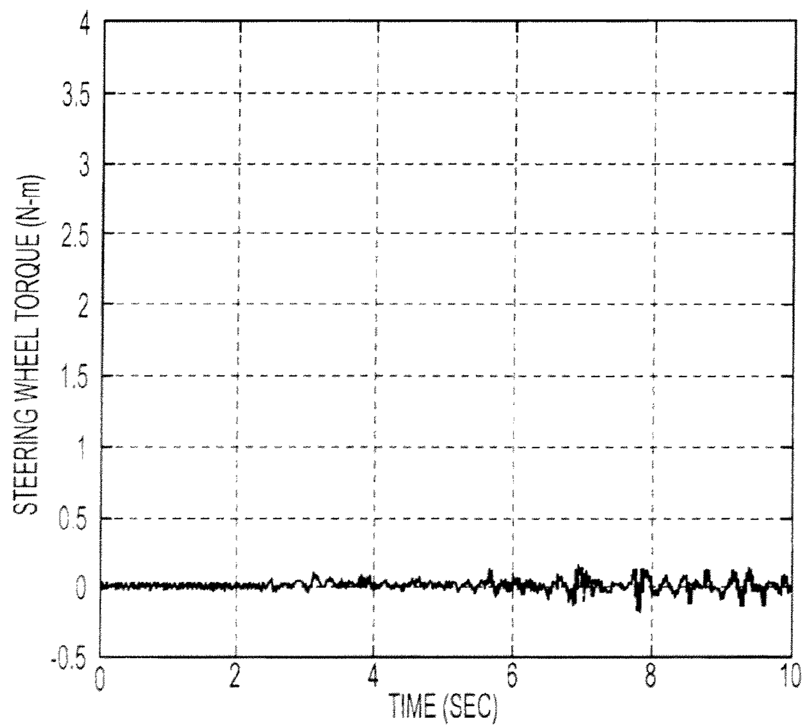

FIGS. 5A and 5B illustrate the steering torque corresponding to the rack force of FIG. 4, with disturbance decoupling/rejection in accordance with the present teachings off and on respectively. As illustrated by FIG. 5A, there was a rather large steering wheel torque disturbance (e.g., affecting steering feel) when disturbance decoupling/rejection in accordance with the present teachings was turned off. As shown in FIG. 5B, however, when disturbance decoupling/rejection in accordance with the present teachings was turned on, the steering wheel torque disturbance was nearly eliminated.

Figure 6A:
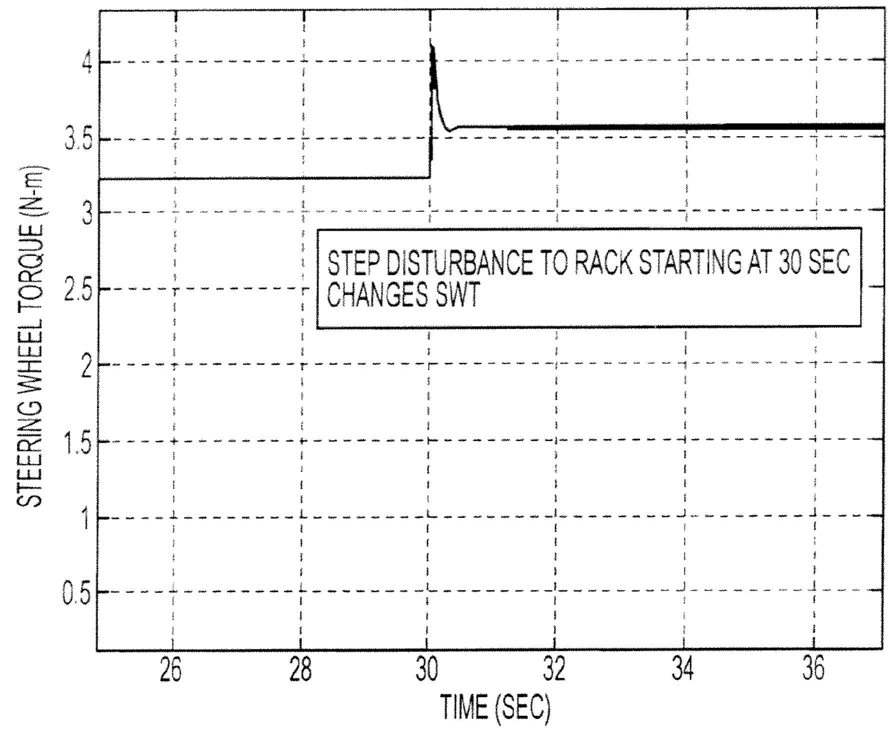
FIG. 6A is a graph illustrating the steering wheel torque corresponding to a simulated vehicle cornering maneuver.
Figure 6B:
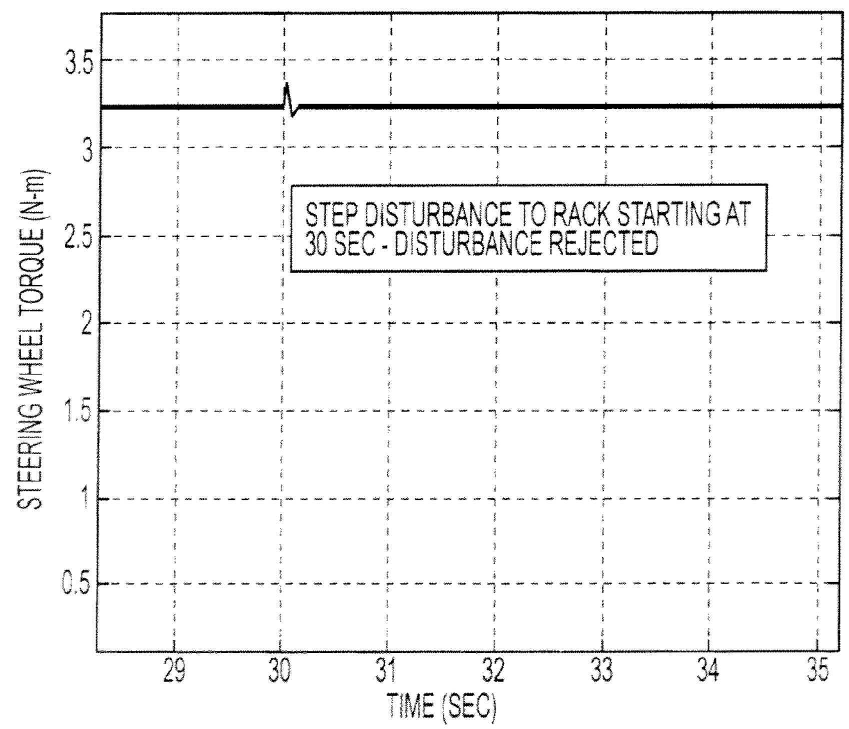

Similarly, in FIGS. 6A and 6B a vehicle cornering maneuver was simulated with a sudden step-shaped rack disturbance at 30 seconds, with disturbance decoupling/rejection in accordance with the present teachings off and on respectively. As illustrated by FIG. 6A, the disturbance impacted the steering wheel torque, thereby, changing the steering feel. As shown in FIG. 6B, however, when disturbance decoupling/rejection in accordance with the present teachings was turned on, the disturbance's impact was greatly reduced, greatly decreasing the change in steering feel.

Figure 7:
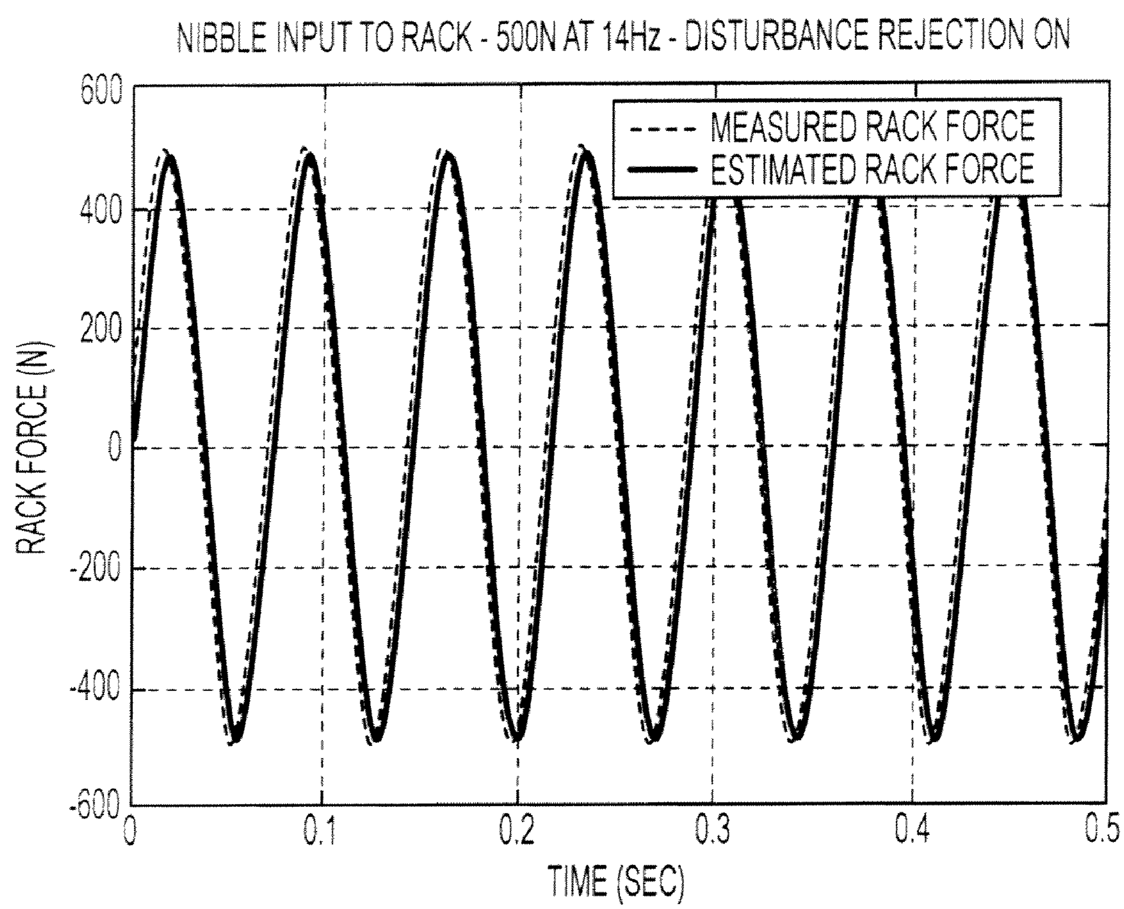
FIG. 7 is a graph illustrating rack force as a function of time for an estimated and a measured rack forces during a simulated sinusoidal vibration disturbance.

In FIG. 7, a simulation was performed to compare an estimated rack force (i.e., generated using a rack force observer in accordance with the present teachings) with a simulated rack force disturbance, and the rack forces (N) corresponding to a simulated sinusoidal vibration disturbance were plotted as a function of time (sec). In the test, to simulate a sinusoidal vibration disturbance, a nibble input (500 N at 14 Hz) was applied to the rack. As shown in FIG. 7, the estimated rack force was nearly identical to the measured rack force over the entire period.

Figure 8A:
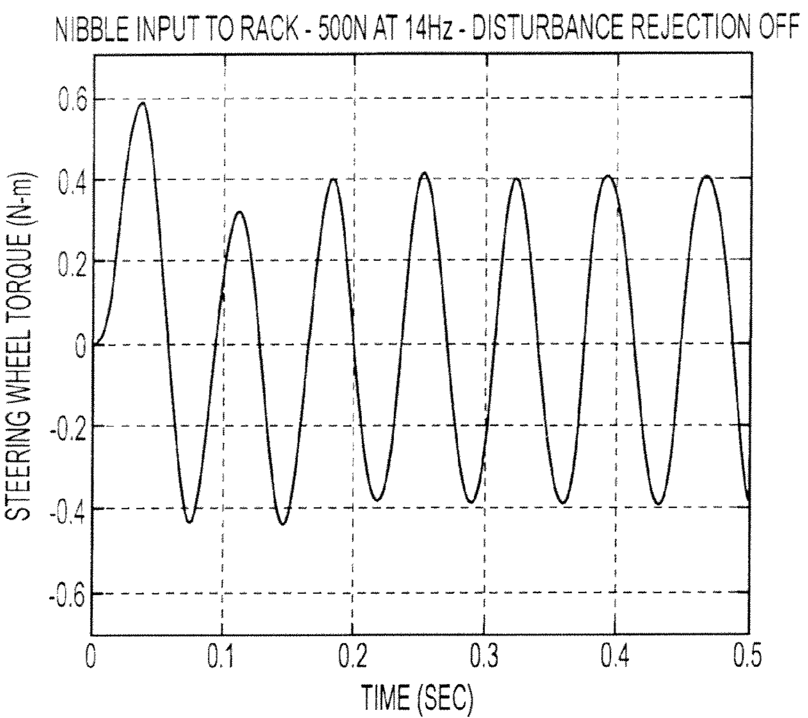
FIG. 8A is a graph illustrating the steering wheel torque corresponding to the rack force of FIG. 7.
Figure 8B:
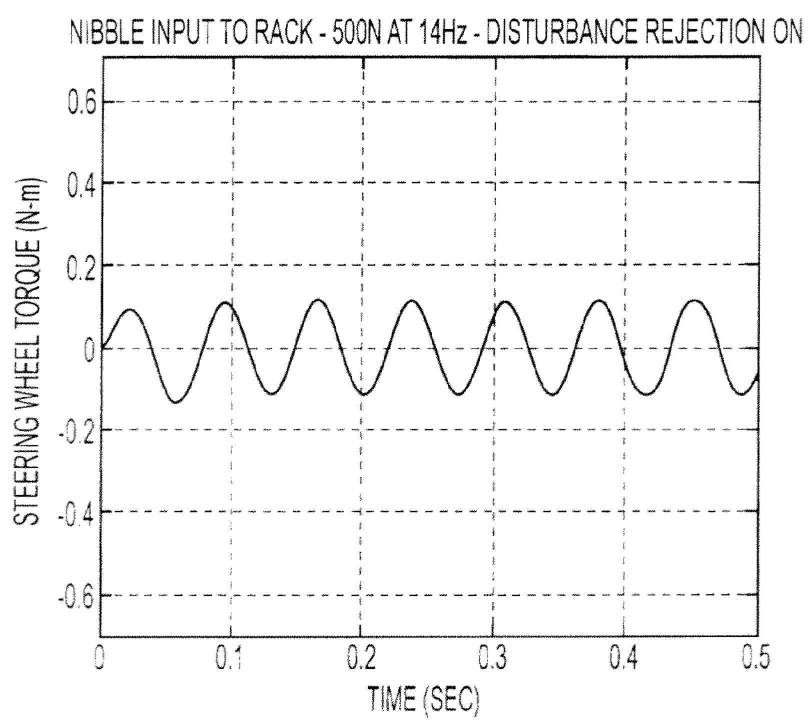

FIGS. 8A and 8B illustrate the steering torque corresponding to the rack force of FIG. 7, with disturbance decoupling/rejection in accordance with the present teachings off and on respectively. As illustrated by FIG. 8A, there was a rather large steering wheel torque disturbance (e.g., affecting steering feel) when disturbance decoupling/rejection in accordance with the present teachings was turned off. As shown in FIG. 8B, however, when disturbance decoupling/rejection in accordance with the present teachings was turned on, the steering wheel torque disturbance was greatly reduced, providing a more constant steering feel.

Accordingly, as demonstrated by FIGS. 4-8, the present teachings can provide robust systems and methods for decoupling steering rack force disturbances in electric steering, independent of a vehicle's dynamic characteristics and the type of disturbance applied to the rack.

While the present teachings have been disclosed in terms of exemplary embodiments in order to facilitate better understanding of the present teachings, it should be appreciated that the present teachings can be embodied in various ways without departing from the principle of the teachings. Accordingly, while the present teachings have been disclosed in terms of using a tire force generator or a rack force generator to determine a reference rack force, and a rack force observer to determine an estimated rack force, the teachings as disclosed work equally well for various quantities and types of controllers and/or microprocessors. For example, the present teachings additionally contemplate a single controller configured to determine both a reference rack force and an estimated rack force. Therefore, the present teachings should be understood to include all possible embodiments which can be embodied without departing from the principle of the teachings set out in the appended claims.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a sensor" includes two or more different sensors. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope its teachings. Other embodiments of the disclosure will be apparent to those skilled in the art from consideration of the specification and practice of the teachings disclosed herein. It is intended that the specification and embodiment described herein be considered as exemplary only.

What is claimed is:

1. A system for decoupling steering rack force disturbances in electric steering, comprising:

a steering wheel angle sensor, a yaw rate sensor, a lateral acceleration sensor, and a steering torque sensor;

a tire force generator configured to receive signals from the steering wheel angle sensor, the yaw rate sensor, and the lateral acceleration sensor and send a reference rack force to a controller; and a rack force observer configured to receive signals from the steering torque sensor and send an estimated rack force to the controller, wherein the controller is configured to receive signals from the tire force generator and the rack force observer, compare the estimated rack force with the reference rack force to determine a rack force disturbance, and adjust an auxiliary torque based on the rack force disturbance.

2. The system of claim 1, wherein the tire force generator is configured to determine a tire slip angle based on signals received from at least one of the steering wheel angle sensor, the yaw rate sensor, and the lateral acceleration sensor.

3. The system of claim 1, wherein the tire force generator is configured to determine a target tire slip angle based on at least one of a target yaw rate and a target vehicle lateral acceleration.

4. The system of claim 2, wherein the tire force generator is configured to determine a tire lateral force based on at least the tire slip angle, a tire normal force and a road friction.

5. The system of claim 4, wherein the tire force generator is configured to determine a tire self-aligning moment based on at least the tire lateral force.

6. The system of claim 5, wherein the tire force generator is configured to determine the reference rack force based on the tire lateral force and the tire self-aligning moment.

7. The system of claim 2, wherein the tire force generator is configured to use a tire cornering stiffness based on a tire used on a vehicle.

8. The system of claim 1, wherein the tire force generator is configured to use the tire cornering stiffness based on a reference tire.

9. The system of claim 1, wherein the rack force observer is configured to determine the estimated rack force by formulating a third-order observer.

10. The system of claim 1, wherein the controller is further configured to send a notification if the rack force disturbance indicates a vehicle safety issue.

11. The system of claim 10, further comprising a notification system configured to receive a signal from the controller and provide feedback to a vehicle driver when the rack force disturbance exceeds a specified value.

12. A system for decoupling steering rack force disturbances in electric steering, comprising:

a yaw rate sensor, a lateral acceleration sensor, and at least one electric steering sensor;

a rack force generator configured to receive signals from the yaw rate sensor, the lateral acceleration sensor, and the at least one electric steering sensor and send a reference rack force to a controller; and a rack force observer configured to receive signals from the at least one electric steering sensor and send an estimated rack force to the controller, wherein the controller is configured to receive signals from the rack force generator and the rack force observer, compare the estimated rack force with the reference rack force to determine a rack force disturbance, and adjust an auxiliary torque based on the rack force disturbance.

13. The system of claim 12, wherein the rack force generator is configured to determine a pre-defined rack force and a pre-defined rack displacement based on a vehicle's suspension design.

14. The system of claim 13, wherein the rack force generator is configured to determine the reference rack force based on the pre-defined rack displacement and the signals received from the yaw rate sensor, the lateral acceleration sensor and the at least one electric steering sensor.

15. The system of claim 12, wherein the rack force observer is configured to determine the estimated rack force by formulating a third-order observer.

16. A method for decoupling steering rack force disturbances in electric steering, comprising:

estimating a reference rack force;

formulating an observer to provide an estimated rack force;

comparing the estimated rack force with the reference rack force to determine a rack force disturbance; and adjusting an auxiliary torque in response to the rack force disturbance.

17. The method of claim 16, wherein estimating a reference rack force comprises determining a tire lateral force and a tire self-aligning moment.

18. The method of claim 16, wherein estimating a reference rack force comprises determining the reference rack force from pre-defined rack force functions of rack displacement.

19. The method of claim 16, wherein formulating an observer comprises formulating a third-order system.

20. The method of claim 16, further comprising providing feedback if the rack force disturbance exceeds a specified value.

* * * * *